(12) United States Patent
Ogram

(10) Patent No.: US 7,694,132 B2
(45) Date of Patent: *Apr. 6, 2010

(54) SECURE INTERMEDIARY COMMUNICATIONS SYSTEM

(76) Inventor: Mark Ellery Ogram, 780 S. Freeman Rd., Tucson, AZ (US) 85748

(*) Notice: Subject to any disclaimer, the term of this patent is extended or adjusted under 35 U.S.C. 154(b) by 1274 days.

This patent is subject to a terminal disclaimer.

(21) Appl. No.: 11/201,372

(22) Filed: Aug. 10, 2005

(65) Prior Publication Data

US 2006/0291655 A1 Dec. 28, 2006

Related U.S. Application Data

(63) Continuation of application No. 11/170,229, filed on Jun. 28, 2005.

(51) Int. Cl.
*H04L 9/32* (2006.01)
(52) U.S. Cl. .................. 713/162; 380/260; 380/264; 380/283; 380/44; 380/47
(58) Field of Classification Search .......... 380/260, 380/264, 283, 44, 47; 713/162
See application file for complete search history.

(56) References Cited

U.S. PATENT DOCUMENTS

| | | | |
|---|---|---|---|
| 7,069,436 B1 * | 6/2006 | Akachi ................ 713/162 |
| 7,117,266 B2 | 10/2006 | Fishman et al. |
| 7,117,357 B2 | 10/2006 | Bade |
| 7,117,359 B2 | 10/2006 | Wood et al. |
| 7,117,362 B2 | 10/2006 | Go et al. |
| 7,117,363 B2 | 10/2006 | Lincoln et al. |
| 7,117,364 B1 | 10/2006 | Hepper et al. |
| 7,117,365 B1 | 10/2006 | Rump et al. |
| 7,117,366 B2 | 10/2006 | Vincent |
| 7,117,369 B1 | 10/2006 | Burns et al. |
| 7,117,370 B2 | 10/2006 | Khan et al. |
| 7,117,371 B1 | 10/2006 | Parthasarathy et al. |
| 7,117,372 B1 | 10/2006 | Trimberger et al. |
| 7,117,373 B1 | 10/2006 | Trimberger et al. |
| 7,117,374 B2 | 10/2006 | Hill et al. |
| 7,117,376 B2 | 10/2006 | Grawrock |
| 7,117,485 B2 | 10/2006 | Wilkinson et al. |
| 7,117,493 B2 | 10/2006 | Matsushima |
| 7,117,495 B2 | 10/2006 | Blaser et al. |
| 7,117,504 B2 | 10/2006 | Smith et al. |
| 7,117,517 B1 | 10/2006 | Milazzo et al. |
| 7,117,526 B1 | 10/2006 | Short |

OTHER PUBLICATIONS

"Cypherix—Borderless Strong Encryption Software" Webpage, http://wwww.Cypherix.co.uk.
"Safeboot—Mobile Data Security" Webpage, http://www.safeboot.com/about/.
"Encryption Software from Pontsec Mobile Technologies", POINTSEC webpage, http://www.pointsec.com/.
USENIX Workshop Paper, "iKP—A Family of Secure Electronic Payment Protocols", by Bellare et al, Jul. 1995.
"Internet Keyed Payments Protocol (iKP)", draft from Tsudik, Jul. 1995.
"Design, Implementation and Depoloyment of iKP Secure Electronic Payment System", IEEE Journal of Selected Areas in Communication, vol. 18, No. 4, Apr. 2000.
"Architecture of Payment Gateway", SEMPER Consortium, Nov. 22, 1996.

* cited by examiner

*Primary Examiner*—Matthew B Smithers
*Assistant Examiner*—Paul Callahan
(74) *Attorney, Agent, or Firm*—Mark Ogram

(57) ABSTRACT

A system for communication of a message in which the message intended for a third computer is first encrypted by a first computer and is sent to a second computer. The second computer, acting as an intermediary, + decrypts the message and re-encrypts the message before sending the message to the third computer which again decrypts the message.

7 Claims, 8 Drawing Sheets

E-MAIL RESPONSE VERIFICATION

SECURE PROGRAM OPERATION

ENCRYPTION
$E_J = R[O_J + R(S_J, M_J), M_J]$

DECRYPTION

AUDIO/VIDEO/PROGRAM
DOWNLOAD

AUDIO/VIDEO/PROGRAM
PLAY BACK

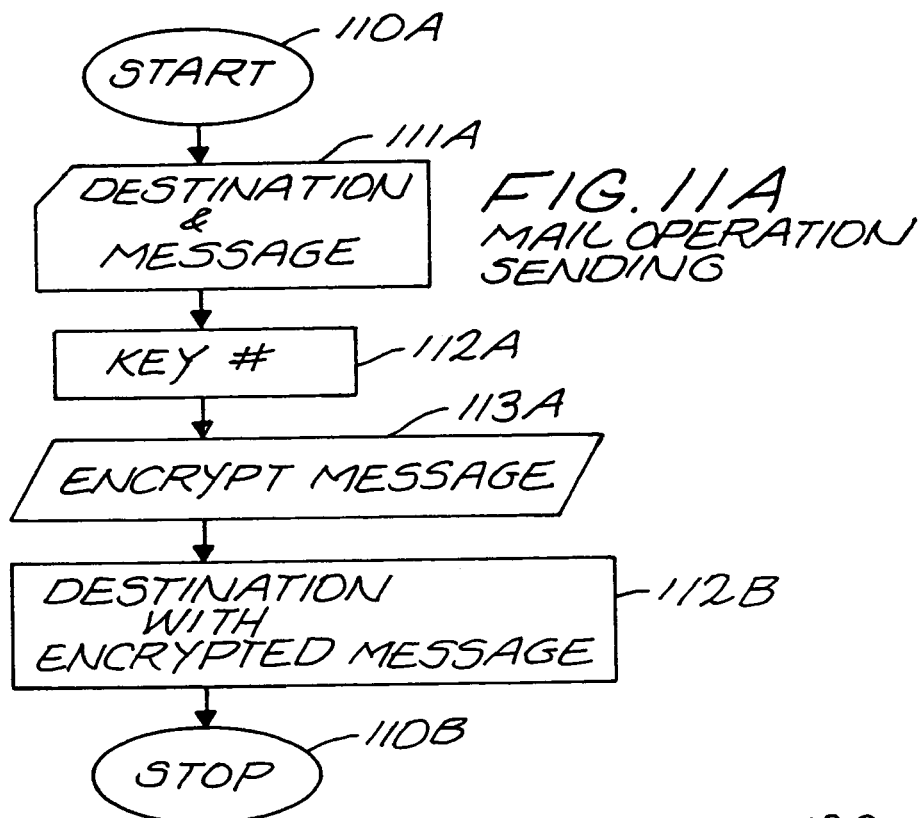
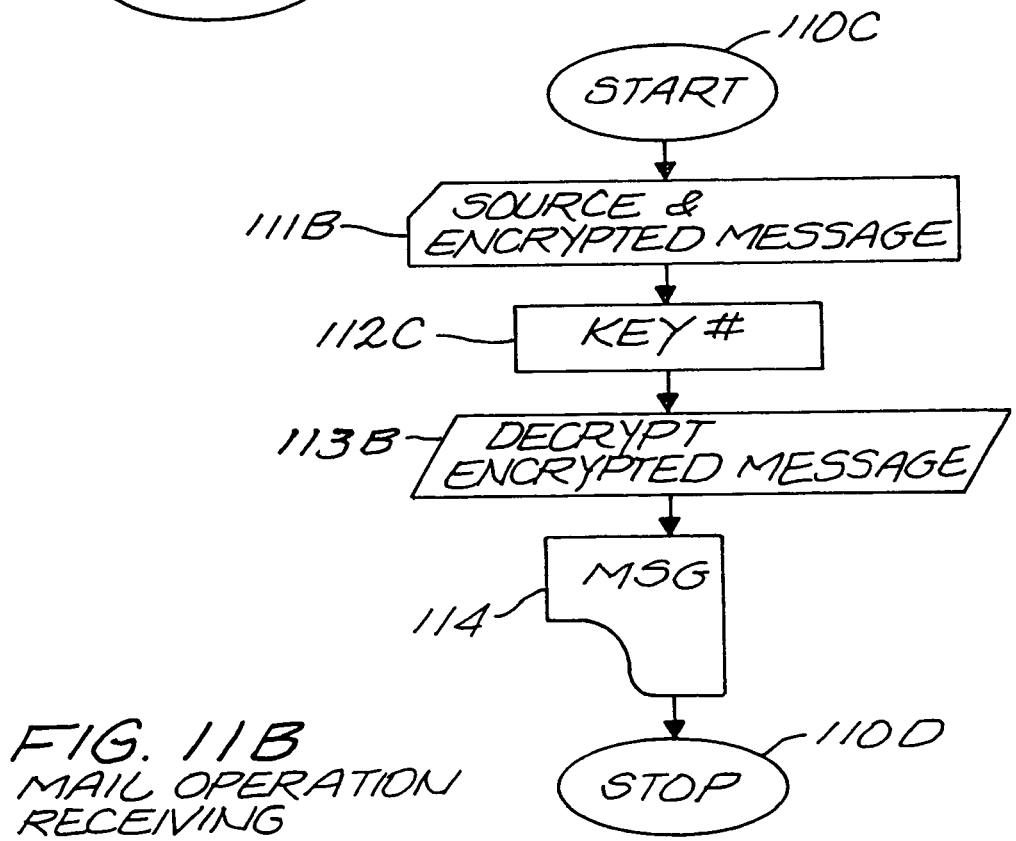

FIG. 12

| | 120 ORIGINAL | | 121 ORIGINAL ADJUSTMENT | | 122 ENCRYPTED | | ENCRYPT-DECRYPT DECRYPTED |
|---|---|---|---|---|---|---|---|
| J | LETTER Oj | VALUE Sj | VALUE Sj | VALUE Ej | LETTER | VALUE ED | LETTER Oj |
| 1 | t | 20 | 4 | 24 | x | 20 | t |
| 2 | h | 8 | 20 | 2 | b | 8 | h |
| 3 | e | 5 | 6 | 11 | k | 5 | e |
| 4 | r | 18 | 21 | 21 | u | 18 | r |
| 5 | e | 5 | 22 | 14 | n | 5 | e |
| 6 | d | 4 | 39 | 18 | r | 4 | d |
| 7 | d | 4 | 27 | 5 | e | 4 | d |
| 8 | o | 15 | 48 | 22 | v | 15 | o |
| 9 | g | 7 | 4 | 3 | c | 7 | g |
| 10 | r | 18 | 14 | 13 | m | 18 | r |
| 11 | a | 1 | 32 | 7 | g | 1 | a |
| 12 | n | 14 | 81 | 21 | u | 14 | n |
| 13 | h | 8 | 80 | 5 | e | 8 | h |
| 14 | o | 15 | 17 | 17 | q | 15 | o |
| 15 | m | 13 | 14 | 22 | v | 13 | m |
| 16 | e | 5 | 42 | 25 | y | 5 | e |
| 17 | — | — | 04 | 21 | u | — | — |
| 18 | — | — | — | 9 | i | — | — |

SECURE INTERMEDIARY COMMUNICATIONS SYSTEM

This is a continuation of U.S. patent application Ser. No. 11/170,229, filed on Jun. 28, 2005, and entitled, "Encrypted Communications".

BACKGROUND OF THE INVENTION

This invention relates generally to the communication of data and more particularly to communications which are encrypted.

While distributed network systems such as the Internet, have expanded the horizons for the world in the collection and dissemination of knowledge, by the very nature of these systems, there has developed a growing awareness that information which is so easily obtained, is also lost with the same ease. The problems and crimes associated with the broad dissemination of information have become common place occurrences, and the problems are only expected to become more pronounce in the future.

These problems include such things as: identity theft; credit card theft; hacking into private data-bases; disrupting private computers through "viruses"; disruption of governmental data bases; fraudulent control of traffic systems; and many more.

Central to all of these problems is the intrinsic anonymous nature of the communications. A receiver of information receives only bits/bytes of digital information and the source of such digital information is generally unknown. Within the Internet, identities are easily created.

In an attempt to provide some level of knowledge of the other side, passwords and ID's (identification values/symbols) are often used. Unfortunately, often these passwords/IDs are stolen and are then used indiscriminately by a criminal or hacker.

Another technique which has been used to curtail the improper gathers of information is the creation of encryption techniques such as the iKP protocol. These protection schemes though attempt to develop a standard encryption methodology which is used for every secure transmission, but this requirement in and of itself tends to make the encryption both difficult in use and in storing.

Almost by the very nature of encryption, encryption must be complex. The Enigma Machine developed by Germany during World War II was an elaborate and complex systems of gears which was used to map each new character and which relied upon the previously mapped message in determining how the next character was mapped.

While there is a natural tendency to use "complex" solutions, these complexities make the use of the solution difficult if not impossible.

It is clear there is a need for an efficient and individualized communication channel.

SUMMARY OF THE INVENTION

A communications system in which a sending computer encrypts a message using a key associated with the computer which is to receive the message; the receiving computer uses a key associated with the sending computer in the decryption process.

In the preferred embodiment, the sending computer is equipped with a set of keys and each key within the set is useable for the encryption process. The selection of a particular key depends on the destination of the message; or, if it is the first time a message is being sent to that destination, the key is arbitrarily selected and a record associated the arbitrarily selected key and the destination is made for future reference.

While the present discussion refers to "computer", the invention is not intended to apply solely to a single or stand-alone computer. Rather, the term "computer" is intended to relate to a single computer as well as a system of computers which work in concert to obtain the objectives outlined.

The following discussion recognizes that a computer is configured to perform a designated operation on data to obtain a desired result. Configuration of a computer is often done through a programming language (e.g. assembly, basic, Colbol, Fortran, C.) which defines the function of the computer, but, in some situations, "hard wired" or dedicated circuitry is also used.

Within the present discussion, the invention relates to a sequence of symbols which are represented in a digital manner. Those of ordinary skill in the art readily recognize a variety of such sequences such as the American Standard Code for Information Interchange (ASCII). In some situations, the digital map to symbols is arbitrarily done. In this case, each symbol is arbitrarily assigned a unique value which forms another level of encryption.

The present discussion refers to the Internet, but, the invention is not intended to be so limited and is viable for any distributed network of computers.

For ease in reference, some many of the terms used herein, such as "computers", "keys", "data", "messages" and the like, have been given labels (such as first, second third or primary, secondary, etc.) to help identify them; but, these labels are not intended to be limiting as to the order of use, ownership, or physical position.

Within this invention, each "computer" is defined by its capabilities or function.

Within the present invention, each digital value which is to be communicated, is mapped uniquely to another value within the field. In this manner, the mapping or encrypting is done on an individual value without any necessary reference to prior or future encryptions. To accomplish this unique mapping objective, the encrypting site and the decrypting site both have a "key" which is used both for the encrypting and decrypting operation. Since the "key" or mapping template provides a unique mapping and that "key" is not available to others, the possibility of a "hacker" being able to fraudulently decrypt the message is all but eliminated.

In this context, the "key" is a series of values which are used in both the mapping process and the reverse-mapping process and consists of a series $S_j$.

The creation of the key is accomplished through a variety techniques, including, but not limited to: random number generation, prior data based, fixed set, historically based, based on the computer identification/serial number, or any combination of the above.

Random number based keys are created using a programmed or "canned" random number generator. These generators produce a series of values which appear random, but, in actuality are not truly random in that each time the random number generator program is initiated, it produces an identical series of "random numbers"; hence, if the encrypting and the decrypting computers operate the same random number generator, both computers develop identical series of values.

An alternative technique creates a series of numbers to create the key using values from the message or the key itself which have been produced or provided earlier. In this case, a Markov type of series is produced. The creation of the function which produces this series of values is limitless and relies only upon the creative power of the developer. As example, the following are all possible functions:

$$S_j=3*S_{j-1}+2*S_{j-2}+S_{j-3} \text{ OR } S_j=3*O_{j-1}+2*O_{j-2}+O_{j-3}$$

$$S_j=\text{Abs}(3*S_{j-1}-(S_{j-2}+S_{j-3})^2) \; S_j=\text{Abs}(3*O_{j-1}-(O_{j-2}+O_{j-3})^2)$$

$$S_j=S_{j-1}+S_{j-2}+S_{j-3} \; S_j=O_{j-1}+O_{j-2}+O_{j-3}$$

$$S_j=S_{j-1}+2 \; S_j=O_{j-1}+2$$

$$S_j=2*S_{j-2}+5 \; S_j=2*O_{j-2}+5$$

(Note, within this discussion, "*" denotes multiplication; "ABS" denotes absolute value)

A fixed set is any sequence of values. Ideally these values should not have any readily discernable relationship or patter, making hacking the message even more difficult. When a fixed set is used, both the encrypting and the decrypting computer ideally have the fixed set within their own memory. Again, the number of sets which can be used are only limited by the creativity of the developer of such sets. Examples of such sets include:

Set 1 3, 6, 9, 32, 55, 43, 29, 23, 5, 13, 19, 91, 28, 21, 23, 11, 19, 100, 43, 56, 59, 132, 255, 1143, 2329, 623, 65, 613, 919, 91, 128, 421, 823, 711, 19, 0

Set 2 2, 4, 7, 4, 9, 3, 6, 1, 9, 6, 6, 8, 5, 4

Note, the length of the fixed set isn't critical to the process as the set can be extended to any required length (to fit the message itself) by simply repeating the fixed set, reversing its order, skipping values when repeating the set, etc. Those of ordinary skill in the art readily recognize a variety of different techniques which allow the fixed set's length to be extended.

Also note, the values within the key are not limited to a particular range; although some embodiments do limit the values to a set range for ease in computation.

A "key" is possible using historical data. In this method, each new message is used to establish a new "key". As example, if the message was, "The red dog ran home", then these values will be used as the key for the second message; and the second message will act as a "key" for the third message; etc.

A "key" can also be made using the computer's own identification. Such fixed values include the serial numbers of the computers involved and/or the e-mail identifier for the computers. Those of ordinary skill in the art readily recognize a variety of techniques which serve this function. As example, assume the computer's serial number is: AJX45812, then a potential initial key is (assigning numerical values to the letters):

27 36 40 4 5 5 8 1 2 with a subsequent set being defined as the value in the first set added to the next occurring value:

63 76 44 9 13 9 29

This technique can be repeated as many times as is necessary to provide mapping values for the length of the message being received.

Even further, some "keys" are created using combinations of the above.

For purposes of description, the following are used as the mathematical basis for the preferred embodiment of the invention.

N denotes the number of symbols or characters within the communication;

$O_j$ denotes the original value for the Jth position in the message, J=1, N;

MSG denotes the communication produced by the series $O_j$, J=1, N;

$S_j$ denotes the adjustment value for the Jth position in the message, J=1, N;

K The key sequence denoted by the series $S_j$, J=1, N;

$E_j$ denotes the encrypted value for the Jth position in the message, J=1, N; While the preferred embodiment place a range for $E_j$ to fall within the range of $O_j$, other embodiments do not have this requirement;

M(A,B) denotes the mapping function $E_j=M(O_j, S_j)$, J=1, N, where M is the function that maps the original value $O_j$ using an adjustment value $S_j$ to get the encrypted value $E_j$;

M'(A,B) denotes a converse map $O_j=M'(E_j, S_j)$, J=1, N which maps the encrypted valued $E_j$, using the adjustment value $S_j$ to recreate the original message $O_j$;

$X_j$ denotes the maximum numerical value for $O_j$; (often this value is fixed for the entire message but in some situations, the maximum value changes during the message);

R(A,B) This function returns the whole number remainder value when A is divided by B (this function is used within the preferred embodiment for the mapping operation).

Using the above references, the preferred embodiment uses a mapping function as indicated:

$$E_j=M(O_j,S_j)=R[O_j+R(S_j,X_j),X_j]$$

Those of ordinary skill in the art readily recognize a variety of other relationships which serve as mapping using the above structures. Examples of these types of mapping are:

$$E_j=M(O_j,S_j)=R[O_j*S_j,X_j]$$

$$E_j=M(O_j,S_j)=R[O_j+2*S_j,X_j]$$

$$E_j=M(O_j,S_j)=R[O_j+S_{j-1},X_j]$$

Further, those of ordinary skill in the art readily recognize alternative mapping functions that are useable in the context described herein.

The invention, together with various embodiments thereof, will be more fully explained by the accompanying drawings and the following descriptions thereof.

DRAWINGS IN BRIEF

FIGS. 11A and 11B are flow-charts of the preferred embodiment's operation for mail for when a message is to be sent and when a message is received.

FIG. 12 is a table illustrating the preferred embodiment's process.

DRAWINGS IN DETAIL

Figure 1:
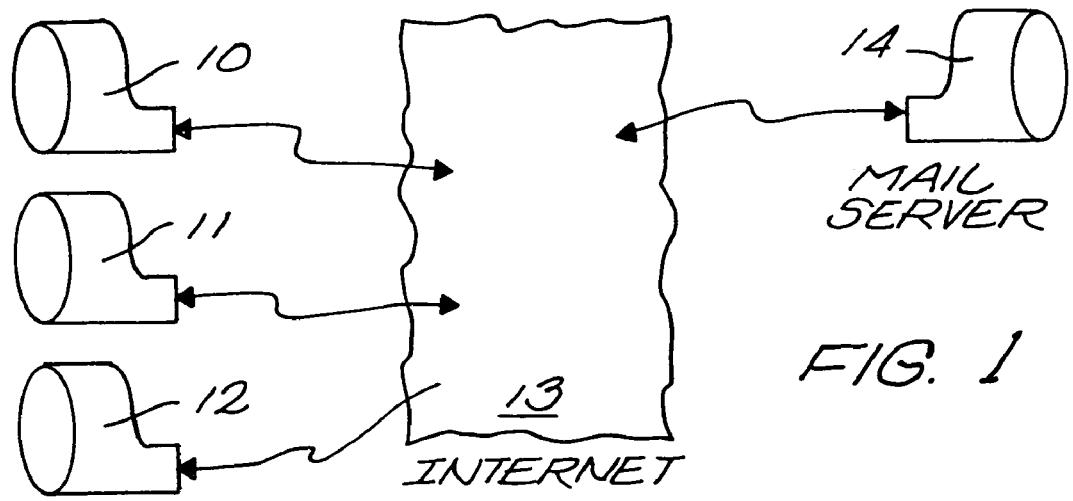
FIG. 1 is a block diagram of the preferred embodiment of the mail server system.

FIG. 1 is a block diagram of the preferred embodiment of the mail server system embodiment of the invention.

Mail server computer 14 is accessible to multiple computers via the Internet 13. For this illustration, three computers are used. Computers 10, 11, and 12, are connected to the Internet 13 and by extension, also to mail server 14.

Two different types of operations are possible with this configuration:

(1) one computer wants to communicate with another in a secure manner, but, the two have not done so previously; and, (2) two computers wish to securely communicate with each other and have done so previously.

Addressing the first scenario, computer 10 is equipped with the encryption software (M) and a set of keys as defined above (in an alternative embodiment, computer 10 is configured to establish the key using one of the techniques above); but, computer 11 does not have the decryption software (M') nor any keys.

The user of computer 10 enters a communication, MSG and a destination address (i.e. the e-mail address for computer 11 (or some other identifier). Computer 14 determines that this destination has not been used before so one of the keys from the set of keys is arbitrarily selected. Using this key and the mapping function, M. The communication MSG is encrypted.

The now-encrypted communication, an identifier of the key used, and the destination address, are communicated to the mail server computer 14 by computer 10 via Internet 13.

Mail server computer 14 recognizes that computer 10 has not previously communicated securely with computer 11. Using the destination information, computer 14 sends an unencrypted message to computer 11 and provides computer 11 with the capability to download the decryption function/software M' together with a single key which is to be used to decrypt the encrypted communication.

In this manner, computer 11 is provided with the capability to receive secure communications from computer 10; but, computer 11 is not able to send secure communications back to computer 10 (nor to any other computers) without acquiring the encryption mapping capability M together with the entire set of keys.

In the second scenario, the case where two computers have already established a relationship, computer 10 is equipped with the encryption software (M) and computer 12 has the decryption software (M') together with a set of keys.

The user of computer 10 enters a communication, MSG and a destination address (i.e. the e-mail address for computer 12 or other identifier). Using the destination address (an identification of computer 12), computer 10 identifies a specific key within the set of keys and uses the specific key with the mapping function M on the communication MSG to create the encrypted message.

The encrypted message is communicated from computer 10 via the Internet 13 to mail server computer 14. Mail server computer 14, knowing the source of the now-encrypted communication, as well as the destination address (computer 12), determines that these two computers have been in previous secure communications; hence, mail server computer 14 passes the communication along to computer 12.

In an alternative embodiment, mail server computer 14 decrypts the message from computer 10 and re-encrypts the message specifically for computer 12. This embodiment provides another level of security.

In yet another embodiment, mail server computer 14 either directly or instructs computer 10 to modify its memory so that the next time a secure communication is sent from computer 10 to computer 12, a different key is used. This modification provides additional security relative to the communications.

Upon receipt of the encrypted message, computer 12, using the source identifier of computer 10, identifies the proper key from its memory which is to be used in the decryption process. This identified key, together with the decryption mapping function M', allows computer 12 to recreate the original message and display (or place in memory) the original message for the user of computer 12.

Computer 12 is also able to send a secure communication to computer 10 in a manner as outlined above for a communication between computer 10 and computer 12.

Note, ideally, the entire encryption/decryption process is "transparent" to the users of computer 11 and computer 12. That is, the users only "see" decrypted material and all encryption and decryption is done automatically.

Figure 2:
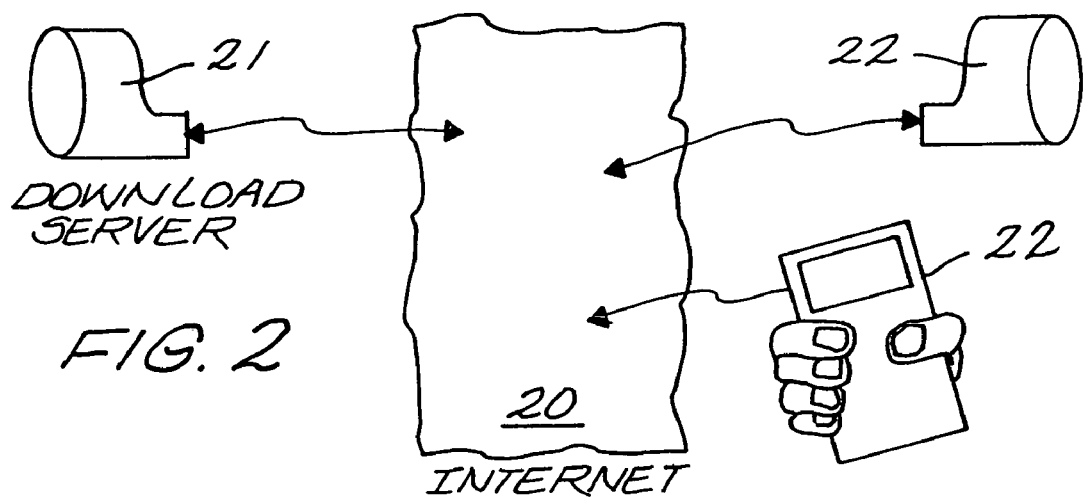
FIG. 2 is a block diagram of the audio/video/program download system of the present invention.

FIG. 2 is a block diagram of the audio/video/program download system of the present invention.

In this situation, the security which is sought isn't against a third party interloper, but, instead is from the user of computer 22 who, while authorized to obtain the data, may want to download data and then improperly share the downloaded data with others who have not paid or who are not authorized to have the downloaded data.

Download server 21 interacts with remote computers via Internet 20. Download server 21 contains digital data which is used to create music, audio, and/or video representations.

When computer 22 wants to acquire such data, contact is made by computer 22 which requests a specific set of data from download server 21. During the request, computer 22 communicates a key specific to computer 22 which is to be used for the encryption and decryption of the data set. This key is ideally an internally stored value or sequence.

Using the key for computer 22 and the data, download server 21 encrypts the data and communicates the encrypted data via Internet 20 to computer 22 which stores the encrypted data in memory. While in some embodiments, the data is decrypted prior to storage, in the preferred embodiment of this system, the encrypted data set is stored in memory and is not decrypted until ready for use.

During use of the encrypted data set by computer 22, portions of the encrypted data set are withdrawn from the memory and are decrypted. This decryption step is accomplished using the internally established key within computer 22; thereby making decryption by any other machine impossible since decryption requires the unique key uniquely found within computer 22.

To further enhance the security of the downloaded material, ideally, only a portion of the encrypted data set is ever withdrawn and decrypted; without the data ever being fully decrypted, the data is not valuable or usable by any other device except computer 22.

In like fashion, handheld computer 22 is able to interact with download server 21 via Internet 20 and obtain data which, when used by handheld computer 22 produces music, audio information, or movies.

Figure 3:
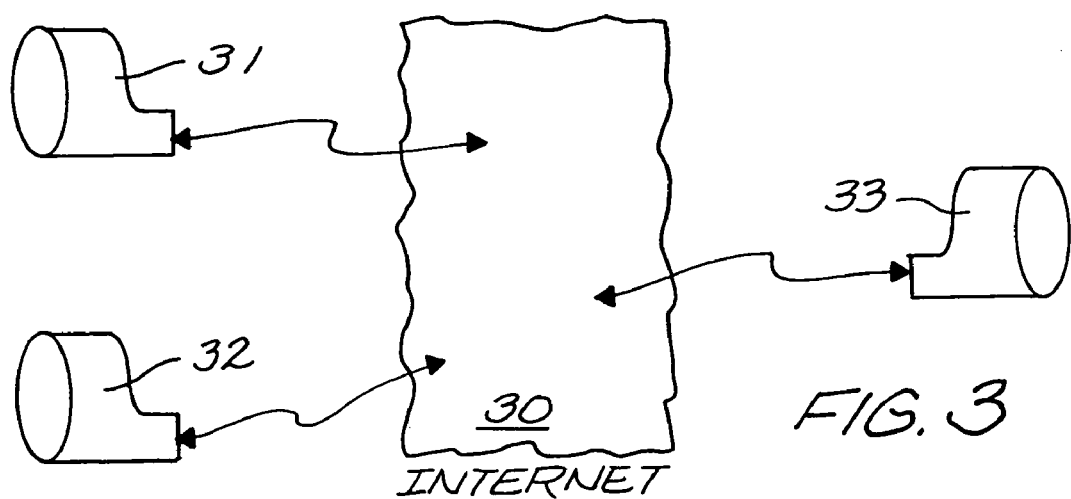
FIG. 3 is a block diagram illustrating secure communications between multiple users.

FIG. 3 is a block diagram illustrating the secure communications between multiple users.

In this embodiment, a mail server is not employed, rather, traditional e-mail communications systems are used for the delivery of the messages. Each computer (31, 32, and 33) is able to send messages which have a destination as well as a message (with or without attachments).

In this embodiment, when a user of computer 31 wants to send a secure transmission to a remote computer 33. Computer 31, by knowing the destination, is able to use the appropriate key to encrypt the message and any attachments for computer 33. On receiving the message, since computer 33 knows the source of the message, computer 33 knows the proper key to use in decrypting the message.

When the user of computer 31 wants to send a secure message to computer 32, a different key is chosen. Computer 31 is creating a series of communications with any number of remote computers, but, each remote computer receives the message in its own unique "language" which is not discernable by the other remote computers. In this manner, unique communications are available. Note, in some situations, a particular key is used with many different computers; but, the selection of the key is still based on the destination computer.

Should computer 33 receives a message purportedly from computer 31, when the message is decrypted, if the resulting message is gibberish, then computer 33 knows that the message did not originate from computer 31 (since the "language" did not match); conversely, if the message makes sense, then the user of computer 33 is assured of the true source of the message.

This technique prevents hackers from assuming a false identity merely to gain access to a computer.

To further enhance this security shield, in one embodiment, a portion of the message being communicated contains an encrypted key which is to be used for the next transmission or reply. This makes it even more difficult for the hacker to counterfeit his identity from the receiving computer. As example, the tenth characters is used as a source in the generation of random numbers by a canned random number generator.

Figure 4:
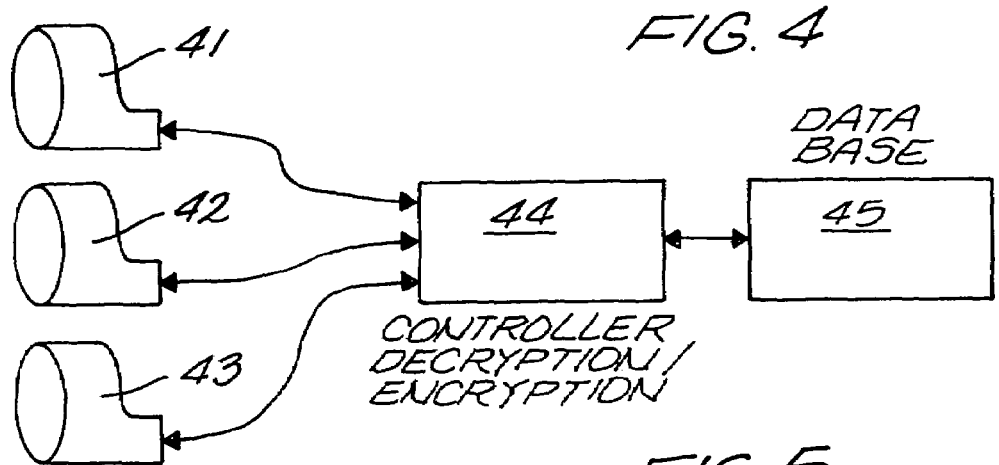
FIG. 4 is a block diagram of an embodiment of the invention used to provide security for a data base.

FIG. 4 is a block diagram of an embodiment of the invention used to provide security for a data base. This embodiment of the invention provides security for a data base which is accessed by many remote sites. Data-base access operations are commonly found in such businesses as: credit card companies; state motor vehicle departments; internal revenue; banking facilities; and many more obvious to those of ordinary skill in the art.

This embodiment prevents an authorized user of the data base from improperly collecting data from the data base for nefarious uses.

In this embodiment, data base 45 contains a large amount of proprietary information which is accessible by remote computers 41, 42, and 43. The material within data base 45 is encrypted and remains encrypted using any of the techniques already discussed or others obvious to those of ordinary skill in the art.

When the operator of computer 41 seeks a certain data set, such as that for a particular customer, the inquiry is sent to controller decryption/encryption 44 which identifies the particular data set within data base 45 (which is encrypted) and requests that encrypted information to be sent by data-base 45 to controller/decryption/encryption 44.

Controller decryption/encryption 44, in the preferred embodiment, decrypts the data set from its stored encrypted state and then re-encrypts the data set using a key which is specific to computer 41. When the secondly encrypted data set is received by computer 41, computer 41 decrypts the data set for use by the user of computer 41.

The user of computer 41 is able to manipulate the data set as per their job (such as changing certain elements to reflect such things as an increased loan amount). To store the up-dated data set, computer 41 encrypts the up-dated data set and communicates the encrypted material back to controller 44.

Controller 44, upon receiving the encrypted data set, recognizes the source of the material and, using the key appropriate for computer 41, decrypts the data set and then re-encrypts the data set commensurate with the encryption technique and key used for data storage within data base 45.

In this manner, the user of computer 41 is only able to acquire a limited amount of data, as the contents of the data base are kept encrypted using a key which is unknown to the user of computer 41.

Figure 5:
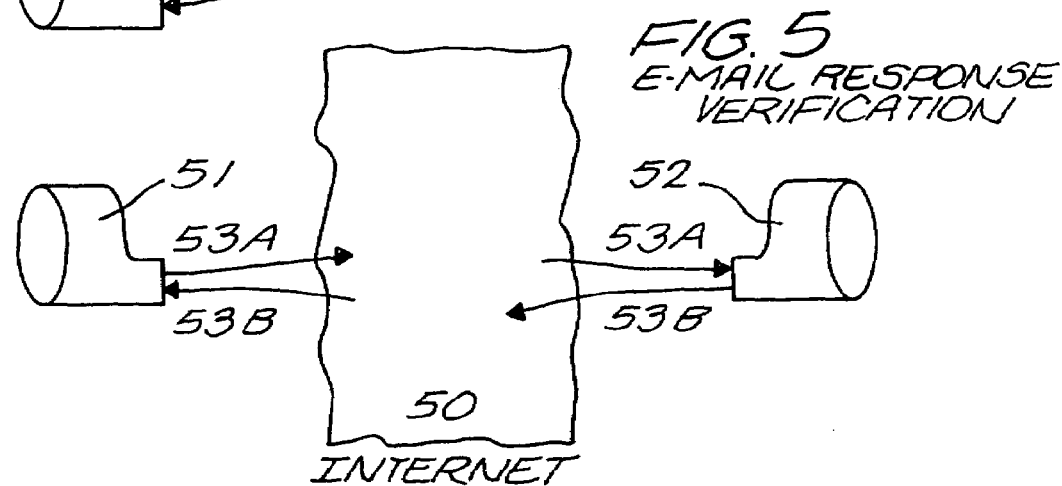
FIG. 5 is a block diagram showing the use of differing encryption systems between a sender and a receiver.

FIG. 5 is a block diagram showing the use of differing encryption systems between a sender and a receiver.

As noted earlier, communication between two computers requires that each of the computers is able to identify the source of the information and the address where information is to be sent. This is true whether the transmission is considered an e-mail or an instant message.

As such, computer 51 and computer 52, when communicating with each other via Internet 50, identify themselves and each other with each of the messages being sent. While some embodiments of the invention utilize the same key for the encryption for the outgoing messages (which is also used for the decryption process), in the preferred embodiment each of the computers 51 and 52 use a unique key for the reply message. This causes message 53A to be encrypted differently than message 53B, even though the same two computers are being used for both messages.

This structure keeps someone from being able to re-create the entire "conversation" between computers 51 and 52 without knowing both encryption keys.

This technique is also extremely useful for identifying if the source of the message is who they claim to be, as a hacker will be unable to properly encrypt a message; hence, when the improperly encrypted message is decrypted, "garbage" is created.

Figure 6:
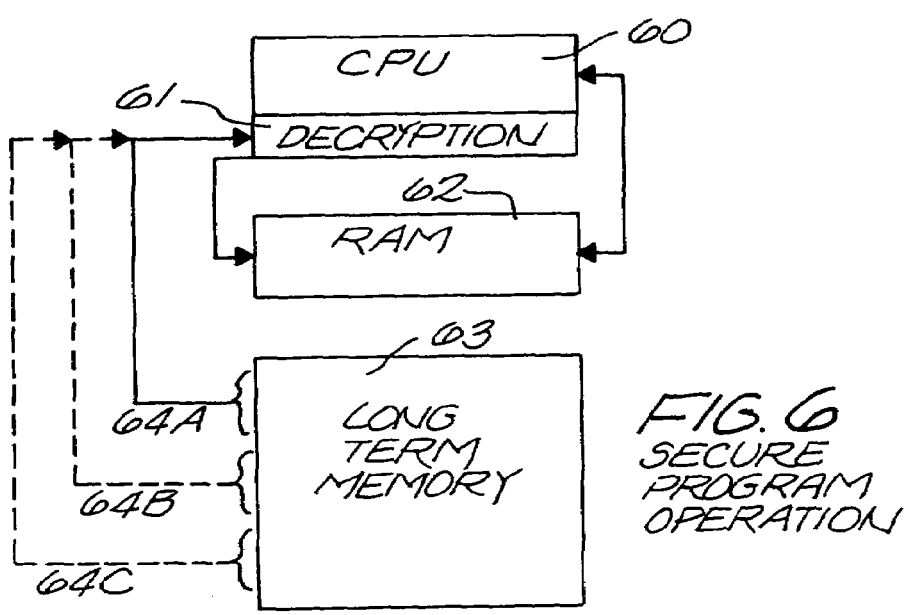
FIG. 6 is a block diagram of the preferred embodiment for the creation of secure usage of a software program.

FIG. 6 is a block diagram of the preferred embodiment for the creation of secure usage of a software program to prevent the pirating of software.

For explanation of this figure, a software program (such as a spread sheet program) has been stored in the long term memory 63 of the computer. The program within long term memory 63 is encrypted using an identifier (such as the serial number) of the computer as the key for the encryption.

When the program is to be operated, Central Processing Unit (CPU) 60 directs a portion of the program 64A to be withdrawn and decrypted 61. The decrypted portion is communicated to the volatile or working memory (e.g. Random Access Memory—RAM, or the like) 62 which is used by CPU 60 in performing the program segment.

When further portions of the program within long term memory 63 are needed, these sections are selectively pulled 64B and 64C, decrypted 61, and used to refresh or replace the contents of RAM 62.

At no time is the entirety of the program within long term memory 63 fully decrypted; rather, only portions of the program are accessible in a decrypted form and hence only a portion of the program is ever available to be "pirated".

Figure 7:
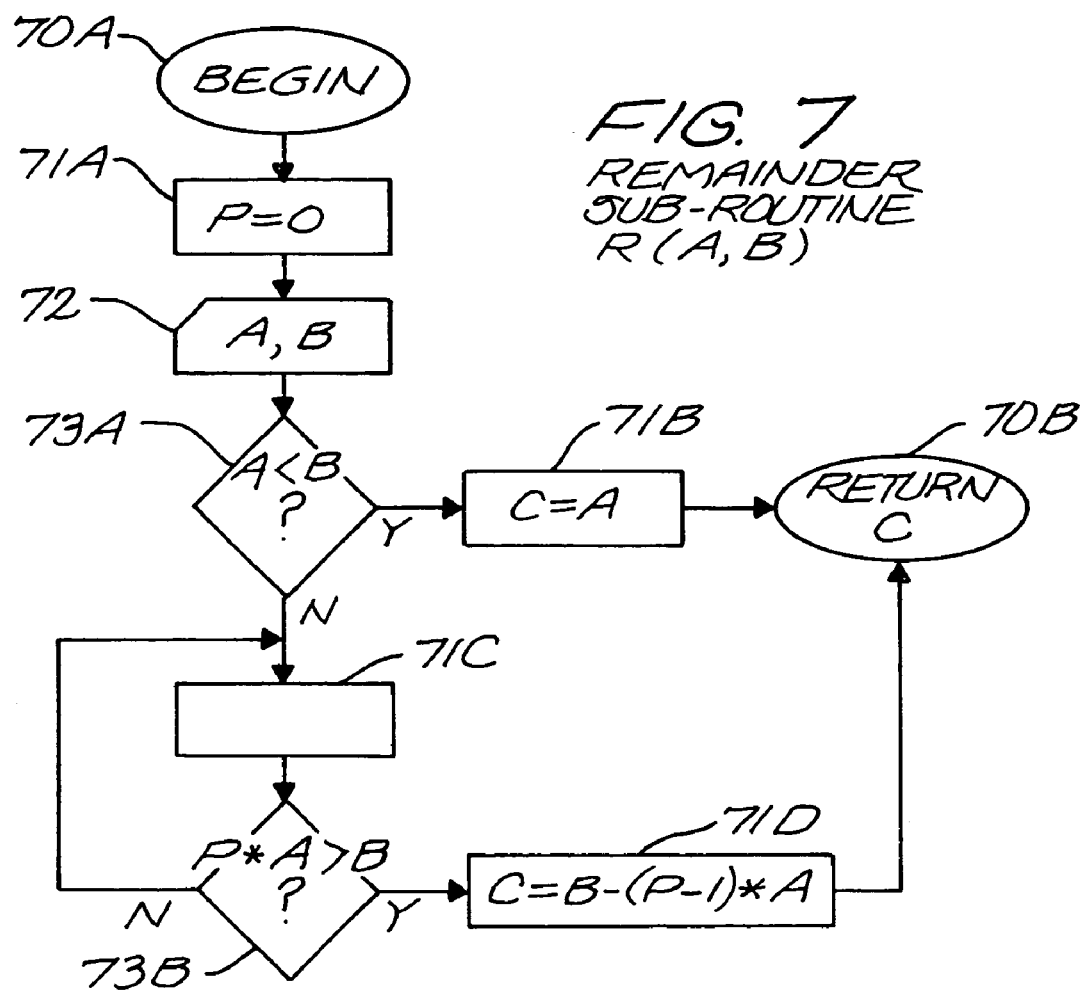
FIG. 7 is a flow-chart illustrating an embodiment of the remainder subroutine used in the preferred encryption technique.

FIG. 7 is a flow-chart illustrating an embodiment of the remainder subroutine used in the preferred encryption technique.

This encryption technique uses a remainder operation in the mapping operations, whether that operation is for encryption or decryption. In this embodiment, the remainder subroutine (R(A,B)) receives the values A and B and returns C, the whole number remainder when A is divided by B.

After the subroutine begins 70A, a pointer is set to zero 71A and the values A and B are obtained 72. A decision is then made if A<B 73A and if so, C is assigned the value A 71B and the subroutine returns C 70B.

If the check of A<B 73A is no, then the pointer is incremented 71C and a determination is made on if the product of P*A>B is made 73B. If the determination is no, then the pointer is incremented again 71C and the process continues until P*A>B (Yes 73B); C is assigned the value of B−(P−1)*A 71D and the program returns the value C 70B.

In this manner, the remainder value is established.

Figure 8:
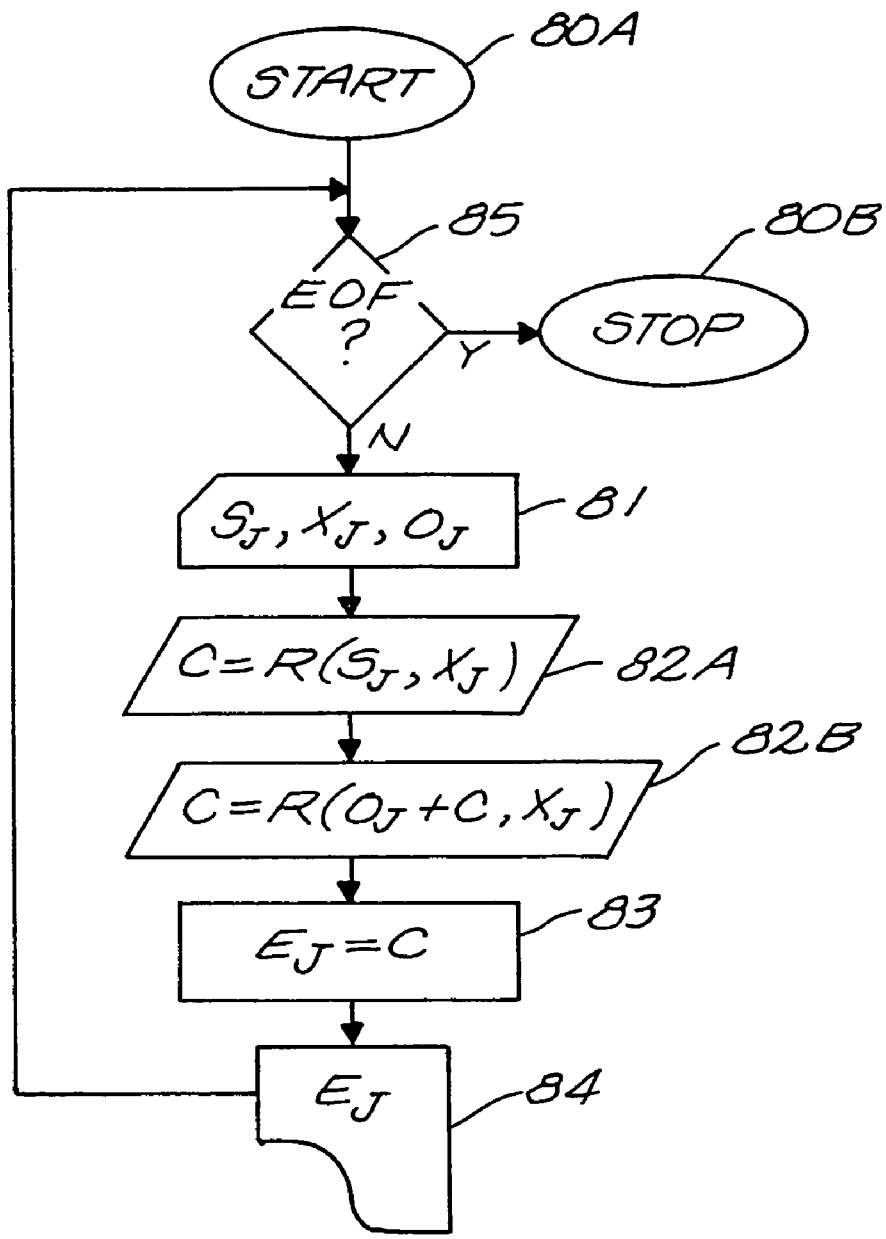
FIG. 8 is a flow-chart illustrating the preferred embodiment for the encryption technique.

FIG. 8 is a flow-chart illustrating the preferred embodiment for the encryption technique. The mapping function for this encryption is (using the references of above):

$$E_j = R[O_j + R(S_j, X_j), X_j] \; J=1,N$$

Once the program starts 80A, a determination is made to see if the End of File (EOF) 85 has occurred. An EOF indicates that the entire message has been read. If there has been an EOF, then the program stops 80B; otherwise, the adjustment value from the key ($S_j$), the maximum number of potential characters ($X_j$) and the original symbol ($O_j$) are obtained 81.

The remainder is obtained ($R[S_j, X_j]$) 82A and the value C is returned. The remainder is obtained for ($R[O_j+C, X_j]$) 82B and C is returned. The encrypted value $E_j$ is assigned the value C and the $E_j$ is then displayed, communicated, or stored 84. The program then returns to check for the EOF 85.

In this manner, the entire message is encrypted, symbol by symbol using a key for the mapping/encryption process.

Figure 9:
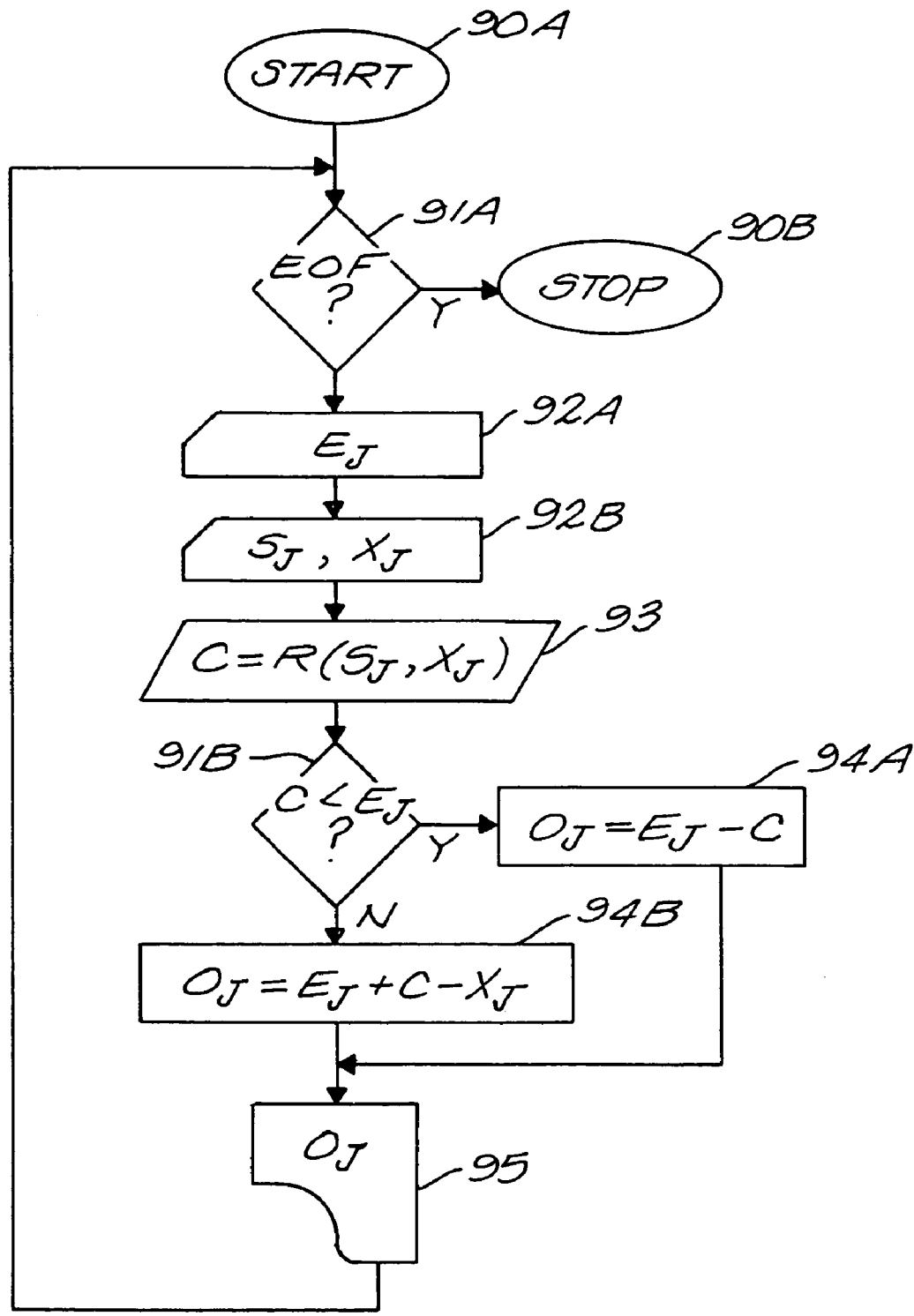
FIG. 9 is a flow-chart illustrating the preferred embodiment of the decryption technique.

FIG. 9 is a flow-chart illustrating the preferred embodiment of the decryption technique.

As noted earlier, ideally the decryption process is performed automatically without any human initiation. In the preferred embodiment of the encryption, the program outlined in FIG. 9 is initiated automatically upon the receipt or opening of an e-mail, instant message, or any other type of message.

Once the program starts 90A, a determination is made on if an End Of File (EOF) has occurred 91A. An EOF indicates that the entire message has been decrypted; hence, on EOF, the program stops 90B.

If there hasn't been an EOF, then the encrypted letter $E_j$ is obtained 92A followed by the adjustment value $S_j$ and the maximum level $X_j$ 92B. The remainder subroutine is initiated on $S_j$ and $X_j$ 93 returning the value C.

A comparison is then made to determine if C is less than the encrypted letter $E_j$ 91B. If C<$E_j$, then the original letter $O_j$ is $E_j$−C 94A; otherwise, the original letter $O_j$ is $E_j$+C−$X_j$ 94B.

With the determination of the original letter $O_j$, the original letter $O_j$ is displayed (or stored) 95 and the program returns to see if an EOF has now occurred 91A.

In this manner, the entire encrypted message is decrypted letter by letter using the adjustment values as the key and the maximum value to assist in the mapping procedure.

Figure 10A:
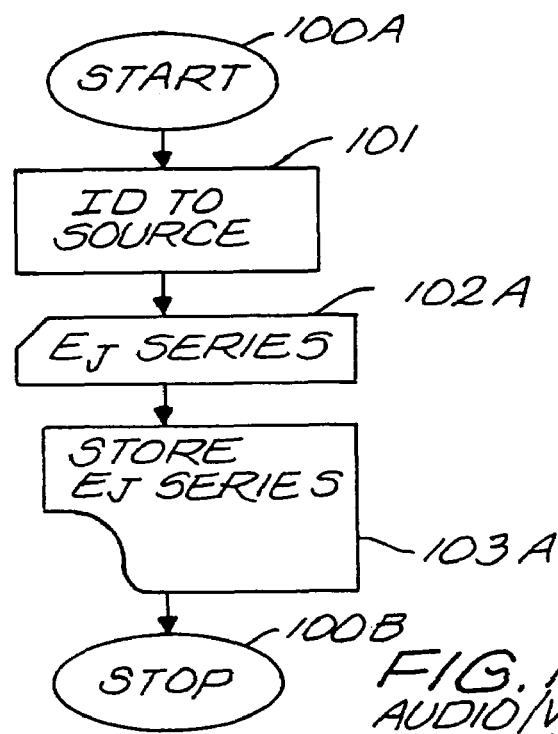
FIGS. 10A and 10B are flow-charts illustrating an embodiment of the audio/video/program download and play-back respectively.
Figure 10B:
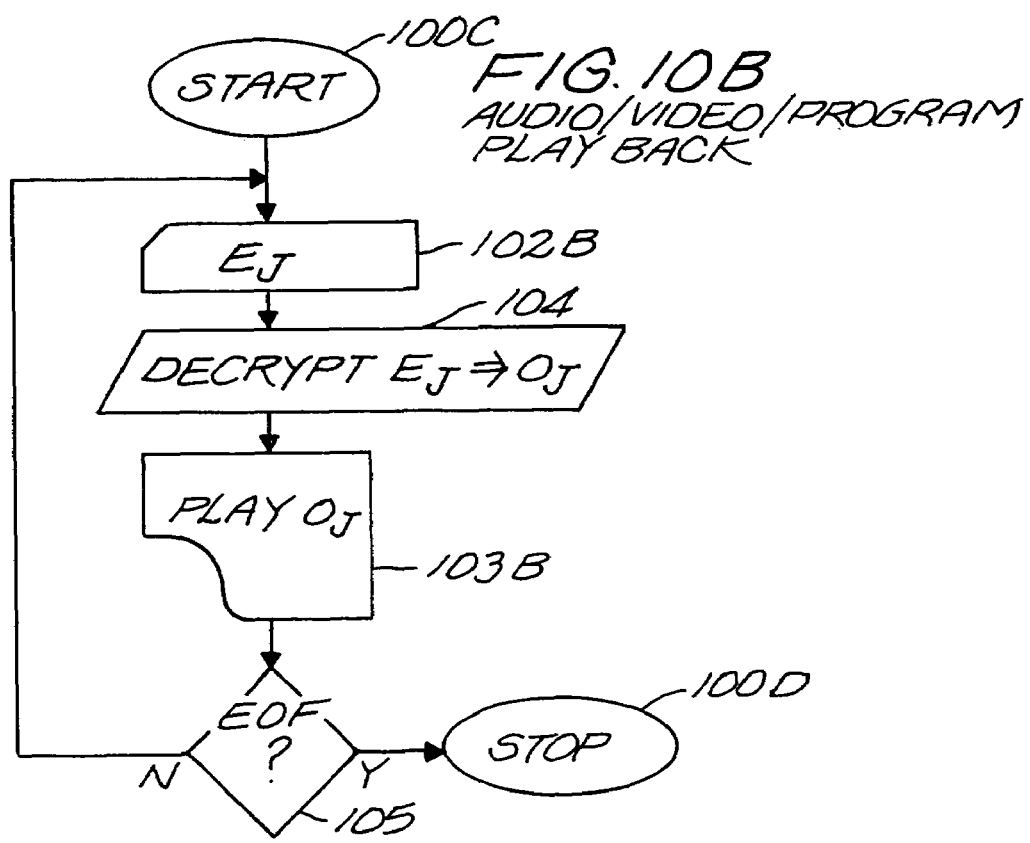

FIGS. 10A and 10B are flow-charts illustrating an embodiment of the audio/video/program download and play-back respectively.

Referencing FIG. 10A, the download component, once the program starts 100A, the computer's identification (i.e. the serial number) is transmitted to the source 101 (where the data is being downloaded from). The source then transmits the encrypted series $E_j$ 102A which is then stored within the computer's memory 103A. The program then stops 100B.

When the encrypted series $E_j$ is to be played (FIG. 10B), the program starts 100C and an particular value $E_j$ is pulled from memory 102B and this value is decrypted resulting in the decrypted value, the original character/value $O_j$ 104. The original character/value $O_j$ is played 103B.

An EOF check 105 is made. If the EOF has been encountered, then the program stops 100D; otherwise the program loops back and pulls another encrypted value 102B.

FIGS. 11A and 11B are flow-charts of the preferred embodiment's operation for mail for when a message is to be sent and when a message is received.

A computer, when sending a message (FIG. 11A) starts the program 110A and obtains the destination and message 111A. Using the destination, a key value is determined 112A and the message is encrypted 113A. The encrypted message is then transmitted through normal channels or via a mail server to the destination 112B and the program stops 110B.

An incoming encrypted message is preferably handled as shown in FIG. 11B. The program starts 110C and the source of the message and the encrypted message is obtained 111B. Using the source information, the associated key for decryption is identified 112C and the encrypted message is decrypted 113B. The now-decrypted message is displayed for the user 114 and the program stops 110D.

FIG. 12 is a table illustrating the preferred encryption and decryption process.

Using the preferred mapping function ($E_j = M(O_j, S_j) = R[O_j+R(S_j, X_j), X_j]$), FIG. 12 illustrates how the message: "the red dog ran home" 120 is first encrypted and then decrypted.

For this example, the numerical values range from 0=blank space, 1="a", 2="b" ... 25="y", and $X_j$ is a constant value 26.

In this example, the key $S_j$, 121 which is used is defined by the series:

4 20 6 21 22 39 27 48 4 14 32 7 81 0 17 17 14 42 8 4

As illustrated, the receiving computer (doing the decryption) uses a reversing algorithm together with the key set $S_j$, which were also used in the encryption operation.

The power of this particular encryption technique is clear when the original message is compared to the encrypted message which is communicated over the distributed network of computers.

Original Message: the red dog ran home 121
Transmitted Message: xbkunrevhcmguaeqveui 122 thereby providing encryption which is unique between the two parties and making the transmission difficult if not impossible to decrypt.

Using the technique above, the present invention provides for a highly personalized, secure, and efficient communication channel.

What is claimed is:

1. A communications system comprising:
 a first computer having stored therein a function M and a first set of keys, each key within said first set of keys defining a series of values, said first computer configured to:
  a) receive a mail-destination and a sequence of original values $O_j$;
  b) based upon said mail-destination, select one of said keys from said first set of keys;
  c) using the function M and the selected key from the first set of keys, transform the sequence of original values $O_j$ to a sequence of transformed values $E_j$, and,
  d) communicate the sequence of transformed values $E_j$ and a source identifier to a second computer:

said second computer having stored therein a function M' and a second set of keys, each key within said second set of keys defining a series of values, said second computer configured to:
- a) receive the sequence of transformed values $E_j$ and the source identifier;
- b) based upon said source identifier, select one of said keys from the second set of keys;
- c) using the function M' and the selected key from the second set of keys, reconstruct the original sequence of values $O_j$ from the sequence of transformed values $E_j$, and,
- d) based upon said destination address, select one of said keys from the second set of keys,
- e) using the function M and the selected key from the second set of keys, transform the sequence of original values $O_j$, to a sequence of transformed values $E'_j$, and,
- f) communicate the sequence of transformed values $E'_j$ and the source identifier to a third computer associated with said destination address; and, said third computer configured to:
- a) receive the sequence of transformed values $E'_j$ and the source identifier;
- b) based upon said source identifier, select a key from a third set of keys; and,
- c) using the function M' and the selected key from the third set of keys, reconstruct the original sequence of values $O_j$, from the sequence of transformed values $E'_j$.

2. The communications system according to claim 1, wherein said third computer further is adapted to:
- a) receive a second mail-destination indicating the first computer and a sequence of second series of original values $O_j'$;
- b) based upon said second mail-destination, select one of said keys from said third set of keys as a response key;
- c) using the function M and the response key, transform the second sequence of original values $O_j'$ to a second sequence of transformed values $E_{j2}$, and,
- d) communicate the sequence of transformed values $E_{j2}$ and a source identifier indicating the third computer to the second computer.

3. A system for communication of an original message, said system including:

a first computer configured to:
- a) establish a selected primary key being a series of values,
- b) receive a destination address and said original message,
- c) using a function M and the selected key, transform said original message to a first transformed message, and,
- d) communicate the first transformed message and a source identifier to a second computer;

the second computer configured to:
- a) using a function M', the source identifier, and the destination address, transform the first transformed message to a second transformed message, and,
- b) communicate the second transformed message to a third computer; and, the third computer configured to:
- a) establish a secondary key being a series of values, and,
- b) using the function M', and said secondary key, transform the second transformed message to the original message.

4. The system according to claim 3, wherein said second computer is configured to:
- a) receive the first transformed message and the source identifier;
- b) based upon said source identifier, establish the selected key; and,
- c) using the function M' and the selected key, reconstruct the original message from the transformed message.

5. A communication system comprising:
- a) a first computer configured to,
  1) receive a destination address and a sequence of original values $O_j$,
  2) establish a first key being a series of values,
  3) using a function M and the first key, transform the sequence of original values $O_j$ to a sequence of transformed values $E_j$, and,
  4) communicate the sequence of transformed values $E_j$, a source identifier of said first computer, and the destination address to a second computer;
- b) wherein said second computer is configured to,
  1) receive said transformed values $E_j$, the source identifier, and the destination address,
  2) based upon said source identifier, establish the first key,
  3) using a function M' and the first key, reconstruct the original sequence of values $O_j$ from the sequence of transformed values $E_j$,
  4) based upon the destination_address, establish a second key,
  5) using a function M" and the second key, transform the sequence of original values $O_j$ to a sequence of transformed values $E'_j$, and,
  6) communicate the sequence of transformed values $E'_j$ and the source identifier to a third computer; and,
- c) wherein said third computer is configured to,
  1) receive the sequence of transformed values $E'_j$ and the source identifier,
  2) based upon said source identifier, establish the second key, and,
  3) using a function M'" and the second key, reconstruct the original sequence of values $O_j$ from the sequence of transformed values $E'_j$.

6. The communications system according to claim 5, wherein M is identical to M".

7. The communications system according to claim 5, wherein M' is identical to M'".

* * * * *